(12) United States Patent
Moix Olive

(10) Patent No.: US 11,609,144 B2
(45) Date of Patent: Mar. 21, 2023

(54) DETECTION OF LEAKAGE IN AN ASPIRATING FIRE DETECTION SYSTEM

(71) Applicant: Carrier Corporation, Palm Beach Gardens, FL (US)

(72) Inventor: Pere Moix Olive, Barcelona (ES)

(73) Assignee: CARRIER CORPORATION, Palm Beach Gardens, FL (US)

(*) Notice: Subject to any disclaimer, the term of this patent is extended or adjusted under 35 U.S.C. 154(b) by 174 days.

(21) Appl. No.: 17/115,482

(22) Filed: Dec. 8, 2020

(65) Prior Publication Data

US 2021/0348982 A1 Nov. 11, 2021

(51) Int. Cl.
*G01M 3/28* (2006.01)
*G08B 17/10* (2006.01)
*A62C 37/50* (2006.01)
*G01N 1/24* (2006.01)

(52) U.S. Cl.
CPC .......... *G01M 3/2815* (2013.01); *A62C 37/50* (2013.01); *G01N 1/24* (2013.01)

(58) Field of Classification Search
CPC ............ G01M 3/00; G01M 3/26; G01M 3/28; G01M 3/2815; G01N 1/24; G08B 17/10–113; A62C 37/50
See application file for complete search history.

(56) References Cited

U.S. PATENT DOCUMENTS

| 6,285,291 | B1 | 9/2001 | Knox et al. |
| 7,129,847 | B2 | 10/2006 | Right et al. |
| 7,162,374 | B2 | 1/2007 | Burkhardt |
| 8,412,481 | B2* | 4/2013 | Knox ................ G01N 15/06 73/1.16 |
| 9,134,716 | B2 | 9/2015 | Cole et al. |
| 9,959,726 | B2 | 5/2018 | Kurtz et al. |
| 10,161,837 | B2* | 12/2018 | Ajay ................ G08B 17/113 |
| 10,302,522 | B2* | 5/2019 | Williamson ......... G01M 3/207 |

FOREIGN PATENT DOCUMENTS

| CN | 107452190 A | 12/2017 |
| DE | 202017006485 U1 | 4/2018 |
| EP | 0197371 B1 | 1/1990 |
| EP | 0696787 B1 | 6/1999 |
| EP | 0880766 B1 | 3/2000 |
| EP | 1006500 A2 | 6/2000 |
| EP | 1056062 B1 | 9/2003 |
| EP | 1638062 B1 | 6/2008 |

(Continued)

OTHER PUBLICATIONS

European Search Report for European Application No. 20382378.6; dated Oct. 16, 2020 (pp. 1-7).

*Primary Examiner* — Nguyen Q. Ha
(74) *Attorney, Agent, or Firm* — Cantor Colburn LLP

(57) ABSTRACT

A method of detecting leakage from a central detector unit 2 of an aspirating fire detection system 1 is described. The method includes actuating a valve 8 to block an outlet 8 of the detector unit 2, operating an aspirator 6 of the detector unit 2 at maximum power, and measuring a differential air pressure across the aspirator 6. If the resulting measured air pressure is below a predetermined threshold, it can be inferred that there is a leak within the central detector unit 2 downstream of the aspirator 6.

12 Claims, 1 Drawing Sheet

(56) References Cited

FOREIGN PATENT DOCUMENTS

Figure 2:
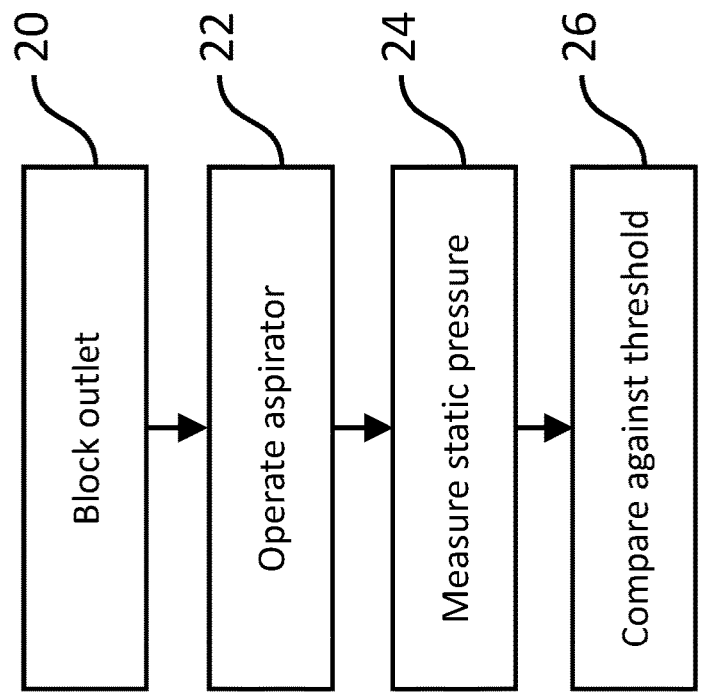

| | | |
|---|---|---|
| EP | 2244236 B1 | 11/2011 |
| EP | 2624229 B1 | 2/2017 |
| FR | 2518287 B1 | 1/1985 |
| GB | 2001464 A | 1/1979 |
| KR | 100269486 B1 | 10/2000 |

* cited by examiner

DETECTION OF LEAKAGE IN AN ASPIRATING FIRE DETECTION SYSTEM

CROSS-REFERENCE TO RELATED APPLICATIONS

This application claims priority to European Patent Application No. 20382378.6, filed May 8, 2020, the contents of which are incorporated by reference herein in their entirety.

BACKGROUND

The present disclosure relates to an aspirating fire detection system, and particularly to the detection of leakage in an aspirating fire detection system.

Aspirating fire detection systems utilise a sampling pipe network comprising one or more sampling pipes with sampling holes open at positions where air samples are to be collected. Air is drawn in through the sampling holes and along the pipes by means of an aspirator within a central detector unit. Within the central detector unit, a portion of the airflow from the aspirator is directed into a sensor chamber. In the case of an aspirating fire detection system, the central detector unit typically operates to detect the presence of smoke and sometimes certain gases such as CO or NOx. Upon a threshold level of a substance being detected, an alarm may be activated and operation of a fire suppression system may be initiated.

The effective detection of leaks within the aspirating fire detection system is important because such leaks can reduce the static air pressure along the pipe network making it more difficult to detect a fire. Consequently, it is common to provide a flow meter at the inlet of the central detector unit to detect leaks or blockages within the piping network.

SUMMARY

Viewed from a first aspect, the present invention provides a method of evaluating a detector unit of an aspirating fire detection system, the method comprising: blocking airflow out of the detector unit; measuring an air pressure downstream of an aspirator of the detector unit; and determining a leak within the detector unit when the measured air pressure is below a predetermined threshold.

The described method provides a technique for detecting a leak within an airflow path of an aspirating smoke detector downstream of an aspirator. This is important because leaks in the airflow path can mean that sample air leaks out of the detector unit and is not correctly sampled by the smoke detector. Furthermore, aspirating smoke detectors are often used in harsh environments, such as around corrosive or noxious fumes. It is undesirable for these substances to leak into a body of the central detector unit, as they could damage the internal circuitry within the central detector unit or could escape into an occupied area within the vicinity of the central detector unit.

Blocking airflow out of the detector unit may comprise actuating a valve downstream of the aspirator. The valve may be proximate to an outlet of the detector unit. The valve may be electrically actuated.

Blocking airflow out of the detector unit may comprise blocking an outlet of the detector unit. The blocking may be performed manually. For example, the outlet may be configured to receive a cap or the like that prevents outlet of air from the detector unit.

The method may comprise operating the aspirator. The aspirator may be operated at a predetermined power, which may be a maximum power of the aspirator. The aspirator may be operated at a predetermined power at least after blocking airflow out of the detector unit. The aspirator may additionally be operated at a predetermined power before blocking airflow out of the detector unit.

The measured pressure may be taken once the pressure has reached equilibrium. For example, the aspirator may be operated for a predetermined period of time before measuring the air pressure. Alternatively, a plurality of time-spaced pressure measurements may be taken and compared to determine when the pressure has reached equilibrium. That is to say, such that the pressure is no longer increasing, or such that fluctuations of the pressure are below a predetermined amplitude.

The measured pressure may comprise a differential pressure. The differential pressure may be a differential pressure between a pressure upstream of the aspirator and a pressure downstream of the aspirator. The downstream pressure may be upstream or downstream of a sensor chamber of the detector unit. Alternatively, the differential pressure may be a differential pressure between ambient pressure and a pressure downstream of the aspirator. The ambient pressure is preferably an ambient pressure of the detector unit.

The method may be performed automatically by the detector unit. The method may be performed periodically. The method is preferably performed periodically and automatically.

The predetermined threshold may be derived from a previous pressure measurement. For example, the predetermined threshold may be a predetermined pressure below the previous pressure measurement, or a predetermined percentage of the previous pressure measurement. In various embodiments, the predetermined threshold may be greater than 80% of the previous pressure measurement. The previous pressure measurement may have been taken under equivalent conditions. That is to say, where airflow out of the detector unit is blocked and the aspirator is operated at the same power level.

A leak within the detector unit may be determined responsive to determining that the measured air pressure is below the predetermined threshold.

The method may comprise triggering an alert responsive to determining the leak. The alert may comprise a visual alarm or audible alarm. The alarm may be generated using an alarm module of the detector unit, such as a speaker or a light. Alternatively, or additionally, the alert may comprise sending a message to a remote unit, such as a fire panel or the like.

The method may comprise resuming normal operation of the detector unit after measuring the pressure, and particularly resuming normal operation of the detector unit if a leak is not detected, for example if the measured air pressure is above the predetermined threshold. Of course, in my many cases, a leak will not completely prevent operation of the detector unit. Therefore, the method may comprise resuming normal operation of the detector unit even if a leak is detected.

Viewed from a second aspect, the present invention provides a detector unit for an aspirating fire detection system, the detector unit comprising: an aspirator, a valve configured to block airflow out of the detector unit; and a pressure sensor configured to measure an air pressure downstream of the aspirator, wherein the detector unit is configured to evaluate itself by the method described above.

The valve may be proximate to an outlet of the detector unit. The valve may be an electrically actuatable valve.

The pressure sensor may be a differential pressure sensor and may be configured to measure a differential pressure.

The differential pressure may be between a pressure upstream of the aspirator and a pressure downstream of the aspirator. Alternatively, the differential pressure may be between ambient pressure and a pressure downstream of the aspirator.

The differential pressure sensor may comprise first and second pressure sensing ports. The first pressure sensing port may be positioned downstream of the aspirator within the airflow path of the central detector unit. The first pressure sensing port may be positioned upstream or downstream of a smoke detector of the detector unit. The second pressure sensing port may be positioned upstream of the aspirator within the airflow path of the central detector unit. Alternatively, second pressure sensing port may be positioned to sense an ambient pressure, such as the ambient pressure outside of the detector unit.

The detector unit may be configured to perform the method automatically and/or periodically.

The detector may comprise a visual alarm or audible alarm.

The aspirator may comprise a centrifugal blower.

The detector unit may comprise a smoke sensor. The smoke sensor may be configured to detect smoke in air drawn into the detector unit by the aspirator. The smoke sensor may be located upstream or downstream of the aspirator. The smoke sensor may be an optical smoke sensor. The optical smoke sensor may operate according to a light-scattering principle. The optical smoke sensor may comprise a light source, such as a laser, and a light detector.

An aspirating fire detection system may comprise the detector unit described above, and one or more sampling pipes for supplying air to the detector unit, wherein the aspirator is configured to draw air into the detector unit via the sampling pipes.

The one or more sampling pipes may form a sampling network, which may extend across a monitored area. The one or more sampling pipes may each comprise a plurality of sampling holes, which may be for drawing air from the monitored area into the detector unit.

DRAWING DESCRIPTION

Figure 1:
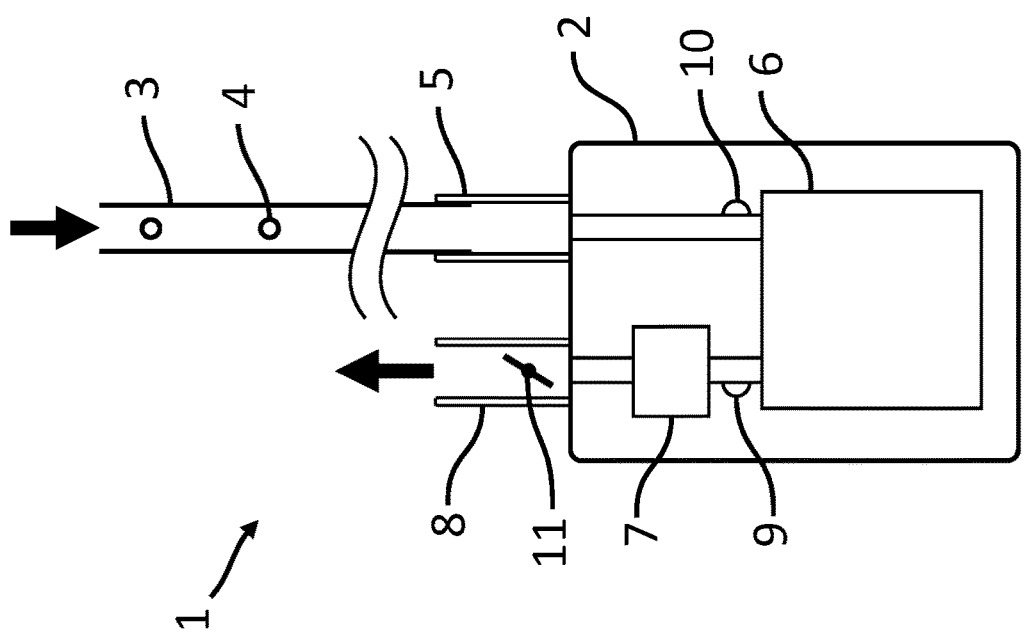

A preferred embodiment of the invention will now be described in greater detail, by way of example only and with reference to the accompanying figures, in which:

FIG. 1 shows a schematic diagram of an aspirating smoke detection system; and FIG. 2 shows a method for evaluating a central detector unit of the aspirating smoke detection system.

DETAILED DESCRIPTION

An aspirating smoke detection system 1 is shown in FIG. 1. The system 1 comprises a central detector unit 2 and at least one sampling pipe 3 for supplying sample air to the central detector unit 2.

The sampling pipe 3 extends across a monitored area, which may be a single room or multiple rooms. The sampling pipe 3 comprises a plurality of sampling holes 4 for sampling air across the monitored area. The sampling pipe 3 connects to an inlet 5 of the central detector unit 2. Whilst a single sampling pipe 3 is shown in the illustrated example, additional sampling pipes 3 may connect to the central detector unit 2. Furthermore, one or more of the sampling pipes 3 may comprise one or more branches along its length.

The central detector unit 2 comprises an aspirator 6 and a smoke sensor 7. The aspirator 6 is connected to the sampling pipe 3 so as to draw air along the sampling pipe 3 into the central detector unit 2, for supply to the smoke sensor 7. The aspirator 6 in this embodiment is a centrifugal blower. However, other types of pump may be used as the aspirator 6.

In this illustrated embodiment, the sample air is output from the aspirator 6 to the smoke sensor 7. However, in other implementations, the aspirator 6 may be located downstream of the smoke sensor 7, such that the aspirator 6 draws air through the smoke sensor 7. Furthermore, sometimes a portion of the air drawn into the central detector unit 2 by the aspirator 6 will bypass the smoke sensor 7. This may be required where the aspirator 6 is sized to draw more air into the central detector unit 2 than the smoke sensor 7 can process, for example where a high suction pressure is required in order to ensure sufficient airflow along the length of the sampling pipe 3.

The smoke sensor 7 is an optical smoke sensor configured to detect the presence of smoke by a light-scattering technique. The smoke sensor 7 comprises a sensor chamber, and a beam of laser light is directed into the sensor chamber. When no smoke is present in the sensor, the laser beam passes through the sensor chamber undisturbed and is absorbed by a light absorber at the other side of the sensor chamber. When smoke is present in the chamber, the laser beam is scattered by the smoke particles in the air and is detected by a photodetector within the sensor chamber.

A controller (not shown) receives sensor data from the smoke sensor 7, and particularly from the photodetector of the smoke sensor 7. The controller may process the sensor data locally in order to determine whether or not to trigger one or more alerts. The alert may comprise an audible alarm using an alarm of the central detector unit 2. Alternatively, or additionally, the alert may comprise sending a message to a remote unit, such as a fire panel or the like.

It is important that all of the components defining an airflow path from the inlet 5 to the outlet 8 of the central detector unit 2 are well sealed. Leaks in the airflow path can mean that sample air from the aspirator 6 leaks out of the central detector unit 2 and is not correctly processed by the smoke detector 7.

Furthermore, the aspirating smoke detection system 1 may be used in a harsh environment, such as around corrosive or noxious fumes. It is undesirable for these substances to leak into a body of the central detector unit 2, as they could damage internal circuitry within the central detector unit 2, or could escape into an occupied area within the vicinity of the central detector unit 2.

In order to detect such leaks, is has been proposed to provide a differential pressure sensor having first and second pressure sensing ports 9, 10. The first pressure sensing port 9 is positioned downstream of the aspirator 6 within the airflow path of the central detector unit 2, and the second pressure sensing port 9 is positioned upstream of the aspirator 6 within the airflow path of the central detector unit 2.

In the illustrated embodiment, the first pressure sensing port 9 is shown upstream of the smoke detector 7, but in alternative embodiments it may be located downstream of the smoke detector 7.

A method of evaluating the central detector unit 2 for leakages from the airflow path is illustrated in FIG. 2. The method is preferably performed automatically by the controller of the detector unit 2.

First, at step 20, the outlet 8 of the central detector unit 2 is blocked so as to prevent air that has been drawn into the central detector unit 2 by the aspirator 6 from leaving. This may be achieved by actuating a valve 11 incorporated into the central detector unit 2 for blocking the outlet 8. The valve 11 could, for example, be an electrically actuated valve. Alternatively, this step may be performed manually, for example by applying an associated cap to the outlet 8.

Next, at step 22, the aspirator 6 is operated at a predetermined power. Typically, it is expected that this would correspond to the maximum power of the aspirator 6, but the technique can be performed using other power levels so long as the power level is consistently reproducible.

At step 24, a static pressure within the airflow path downstream of the aspirator 6 is measured using the pressure sensor. This pressure is preferably a differential pressure between the first and second pressure sense ports 9, 10, i.e. upstream and downstream of the aspirator 6. However, alternatively, the differential pressure may be between ambient pressure and the pressure downstream of the aspirator, which should give approximately the same value in most situations. That is to say, the second pressure sense port 10 may be positioned to measure an ambient pressure. In yet further embodiments, the second pressure sense port 10 may be omitted and the pressure sensor may operate with reference to a fixed, reference pressure.

At step 26, the measured pressure is compared to a threshold value. If there are no leaks, then the measured pressure would be expected to be determined by the power of the aspirator. However, if there is a leak in the airflow path downstream of the aspirator 6 and upstream of the exit 8, then there will be an escape of gas from the airflow path and the measured pressure will be lower.

The threshold value is set slightly below the expected value to account for minor fluctuations, such as 1-5% below the expected value. The expected value should not change significantly over time. Consequently, the expected value may be an earlier measurement, for example taken when installing the central detector unit 2. Alternatively, the expected value may be a value determined by the manufacturer for the particular model of the central detector unit 2.

Responsive to the measured pressure falling below the predetermined threshold, the central detector unit 2 may trigger an alert. The alert may comprise a visual or audible alarm generated using an alarm of the central detector unit 2. Alternatively, or additionally, the alert may comprise sending a message to a remote unit, such as a fire panel or the like, or sending a message to an operator, for example by email, SMS or the like.

After completing the test, the outlet is unblocked and the power of the aspirator 6 is returned to normal, operational levels such that normal operation of the detector unit 2 is resumed.

The testing method described above may advantageously be performed automatically by the detector unit 2. For example, the testing method may be triggered responsive to a command from an operator. Alternatively, or additionally, the testing method may be triggered according to a predetermined schedule, such as once per day.

What is claimed is:

1. A method of evaluating a detector unit of an aspirating fire detection system, the method comprising:
    blocking airflow out of the detector unit by blocking an outlet of the detector unit;
    measuring an air pressure downstream of an aspirator of the detector unit; and
    determining a leak within the detector unit when the measured air pressure is below a predetermined threshold.

2. A method according to claim 1, wherein blocking airflow out of the detector unit comprises actuating a valve at an outlet of the detector unit.

3. A method according to claim 1, further comprising:
    operating the aspirator at a predetermined power after blocking airflow out of the detector unit.

4. A method according to claim 1, wherein the measured pressure comprises a differential pressure.

5. A method according to claim 4, wherein the differential pressure is a differential pressure between a pressure upstream of the aspirator and a pressure downstream of the aspirator.

6. A method according to claim 4, wherein the differential pressure is a differential pressure between an ambient pressure of the detector unit and a pressure downstream of the aspirator.

7. A method according to claim 1, wherein the method is performed periodically and automatically by the detector unit.

8. A method according to claim 1, wherein the predetermined threshold has been derived from a previous pressure measurement.

9. A method according to claim 1, further comprising:
    triggering an alert responsive to determining the leak.

10. A detector unit for an aspirating fire detection system, the detector unit comprising:
    an aspirator,
    a valve configured to block airflow out of the detector unit; and
    a pressure sensor configured to measure an air pressure downstream of the aspirator,
    wherein the detector unit is configured to evaluate itself by a method according to claim 1.

11. A detector unit according to claim 10, further comprising:
    a smoke sensor located downstream of the aspirator and configured to detect smoke in air drawn into the detector unit by the aspirator.

12. An aspirating fire detection system comprising:
    a detector unit according to claim 10; and
    one or more sampling pipes for supplying air to the detector unit,
    wherein the aspirator of the detector unit is configured to draw air into the detector unit via the sampling pipes.

* * * * *